United States Patent Office 3,398,008
Patented Aug. 20, 1968

3,398,008
GRINDING METHOD
Daniel A. Jacobs and James B. Duke, Metuchen, N.J., assignors, by mesne assignments, to Engelhard Minerals & Chemicals Corporation, Edison, N.J., a corporation of Delaware
No Drawing. Continuation-in-part of application Ser. No. 421,108, Dec. 24, 1964. This application Jan. 16, 1967, Ser. No. 609,353
The portion of the term of the patent subsequent to Apr. 11, 1984, has been disclaimed
10 Claims. (Cl. 106—288)

ABSTRACT OF THE DISCLOSURE

The particle size of white or pastel mineral pigments or fillers, such as kaolin or talc, is reduced by agitating a dispersed aqueous pulp of the mineral with steel shot in the presence of added caustic. The ground (micronized) pigment or filler is bleached with a bleach reagent, such as a hydrosulfite salt, to eliminate discoloration due to iron stain indigenous to the mineral.

Related application

This application is a continuation-in-part of Ser. No. 421,108, filled Dec. 24, 1964, entitled, "Grinding Method," now U.S. 3,313,492. Reference is made to the disclosure of said patent as to the particulars of the unique micronizing method described therein.

Background of invention

When white or light colored fillers or pigments, such as clays, are micronized by agitating a dispersed aqueous pulp of the pigment with small round steel particles, such as steel shot, in accordance with the process of U.S. 3,-313,492, the pigment tends to increase in iron content and to become discolored. This occurs in spite of the fact that during the grinding the dispersed pulp is distinctly alkaline (e.g., a pH of 8) and the shot is clean and free from scale before use.

Iron pickup by the pigment during grinding is a serious problem because economically prohibitive quantities of bleach reagent are required to brighten the pigment to levels normally achieved by chemical bleaching of the minerals. In some cases, even the use of excessive bleach does not result in products having normal brightness.

Summary of invention

An object of this invention is to reduce the iron pickup by mineral pigment or fillers when they are micronized with steel particles by the process of said copending application.

In accordance with the present invention, iron pickup by a mineral pigment during the steel shot grinding of a dispersed slip of the clay is eliminated by adding to the grinding charge a substantial quantity of alkali in the form of sodium hydroxide or soda ash.

The pigment or filler has a normal bleach demand when ground in accordance with the principles of this invention. In fact, in some instances, the bleached product may be unexpectedly bright, indicating that the pigment is being scrubbed simultaneously with the particle size reduction.

The reduced iron pickup apparently results from the fact that the shot is not oxidized in the mill. Passivation of the shot would account for the curtailed corrosion of the shot during use. This passivation is probably the result of the presence in the pigment pulp of a combination of anions—namely, the condensed phosphate and/or silicate anions of the pigment dispersant and the hydroxyl ions of the basic additive. Using soda ash to adjust pH, carbonate ions will also be present. These anions probably contribute to passivation when they are present. An advantage of the process of the invention is that the grinding medium remains passivated for prolonged periods. Thus, the medium can be recycled in batch tests or it can be used in continuous grinding circuits. It is well known that iron passivation is frequently temporary and/or unstable. The passivation of iron with nitric acid is a familiar example of unstable passivation.

A wide variety of minus 325 mesh (about 40 microns) material, natural and synthetic, can be reduced in particle size by the process of this invention. The process works well with crystalline material that is very hard and difficult to grind in the minus 10 micron size range, e.g., kaolin clay, calcite and talc. The process is also very effective with noncrystalline (amorphous) material, such as, for example, calcined kaolin clay.

The grinding medium we use is composed of particles predominantly within a specific mesh size range; namely, minus 4 plus 35 mesh or 4/35 mesh (Tyler). In other words, the major weight percentage, and preferably substantially all, of the grinding media should be fine enough to pass a 4 mesh (Tyler) screen and be coarse enough to be retained on a 35 mesh (Tyler) screen. The desired results are not obtained with grinding media that are too fine or too coarse. Preferably 10/35 mesh steel shot is employed although we can employ small steel balls about $\frac{1}{32}$-inch to $\frac{1}{8}$-inch in diameter (about 6 to 20 mesh, Tyler). We prefer to use the steel shot in the "as-cast" condition. In this case, the shot will generally be free from the scale of heat-treated shot products. When the scaley shot must be employed, the scale should be removed before the shot is used. This can be accomplished, for example, by agitating the shot in a clay dispersion at high pH, e.g., a pH of 10 to 12, screening the burnished shot from the clay slip and recovering the shot.

In putting this invention into practice, the grinding mill can be any horizontal vessel having a smooth cylindrical interior, such as a drum. The interior surfaces of the mill must be smooth and wettable by the liquid medium. The desired results are not realized when the liquid in the charge does not wet the inner surface of the drum. As mentioned hereinabove, the drum must be free from baffles or other agitator means. The grinding vessel is provided with means for continuously rotating the vessel about its horizontal axis. For small scale experimental runs, an open-neck glass jar having a cylindrical body will suffice. Commercial mills may be adapted for closed circuit grinding by connecting the mill in series with a classification system to remove fines as they are formed and to recycle the oversize.

In preparing the pigment for the grinding operation, the minus 325 mesh grindable material is slipped in water. The pigment dispersant can be present in the water before addition of the mineral pigment material. Alternatively, all or a part of the dispersant can be added after the pigment is added. Dispersants include water-soluble alkali metal silicates, especially sodium silicates, alkali metal condensed phosphates, such as tetrasodium pyrophosphate, sodium hexametaphosphate, sodium tetraphosphate and sodium carbonate. Before the dispersed pigment slip is contacted with the steel grinding medium, caustic soda or soda ash is added in quantity sufficient to passivate (prevent corrosion) of the steel grinding medium. Generally speaking, the pH of the caustic-treated slip should be within the range of 10 to 12, preferably about 10.3 to 11.5. Variations in pH can be expected with variation in dispersant quantity and species.

In putting the invention into practice, the minus 325 mesh grindable material is slipped with water, or other liquid, using a dispersing agent if necessary to impart fluidity to the slip. With most grindable material, the proportion of solid grindable material to liquid will be within the range of about 10 to 50 parts by weight of the solid grindable material to 50 to 90 parts by weight of liquid, i.e., the charge of material to be ground is in the form of a slip containing 10 percent to 50 percent solids, weight basis, exclusive of the grinding medium. The solids of the slip will vary with the nature of the liquid and solids and is limited by the necessity for forming a slip which is distinctly fluid. In the case of raw (uncalcined) clay or calcined clay, both of which are very responsive to the process, 20 percent to 30 percent solids slips are preferred.

The slip is charged to a horizontal drum that is free from flights, baffles or agitators, with the slip only partially filling the drum. It is preferable to charge the drum with a volume of slip such that the slip with added grinding medium fills about half the drum or is somewhat below the midpoint of the drum when the drum is at rest.

The finely divided grinding medium is added to the fluid slip (or vice versa) in amount such that the particles of grinding medium are completely immersed in the slip when the drum with slip and grinding medium is at rest. Especially good results have been realized when the volume of the particles of grinding medium was about one-third the volume capacity of the grinding drum and the entire contents of the drum, including the grinding medium, occupied about half the volume of the drum under quiescent conditions. In other words, the particles of steel grinding medium occupied about two-thirds of the total volume of the charge to the drum.

The horizontal drum with contents is rotated about the horizontal axis of the drum at a specific speed. This speed, which is below critical speed, is such that the grinding medium and material to be ground remain suspended in the slip during the grinding and the slip with suspended medium tends to rise in the drum in the direction of rotation of the drum. The slip with suspended grinding medium remains substantially as a unitary or integral body (as opposed to a strongly agitated body in which extensive splashing of liquid occurs or in which a substantial part of the grinding medium rises out of the liquid and then descends back into the liquid). Within the unitary body, the grinding medium moves in a generally continuous, substantially elliptical closed path.

The slip with grinding medium is tumbled until the micron-size particles in the slip have been comminuted to the desired size. The time to effect the desired degree of comminution is typically within the range of 10 minutes to 10 hours, and is usually within the range of ½ hour to 2 hours.

After tumbling is completed, the slip is separated from the grinding medium by sedimentation and decantation, or by screening. To obtain the solids in the slip in dry form, the slip can be flocced, filtered, dried and ground.

The steel grinding medium from the process can be continuously recycled or reused since it does not corrode when employed at the high pH. When not in use, the particles should be stored in an aqueous solution of caustic soda or soda ash at a pH of 11 or above.

In carrying out the process on a continuous basis, the ground pigment slip is continuously withdrawn from the mill while fresh slip is charged. The steel medium remains in the mill.

Examples of the invention

The clay used in the examples was "NoKarb" clay, a coarse size fraction of kaolin clay obtained by blunging a Georgia kaolin crude in dilute sodium silicate solution, degritting to eliminate plus 325 mesh particles and fractionating the degritted slip with a cut-off at 2 microns (equivalent spherical diameter, or e.s.d.). The fraction containing the coarse clay (NoKarb) had a solids content of about 30 percent by weight and contained sodium silicate dispersant. The NoKarb clays employed in the examples were used in the form of aqueous slips obtained by this procedure.

The shot employed in the tests was as-cast 10/35 mesh steel. The shot was clean and free from visible signs of corrosion.

The one-gallon experimental rotating mill used in Examples II and III was an open-mouth cylindrical glass jar resting horizontally on a pair of horizontal rollers connected to a variable speed drive so as to rotate continuously the jar about its horizontal axis without vibrating the jar. The speed of 100 r.p.m. used in the experiments corresponds to a peripheral velocity of about 300 ft./min. This speed, which is 93 percent of critical speed, was such that the contents of the jar had the required action for grinding, as described hereinabove.

In these examples, unless otherwise indicated, all proportions represent weight proportions and all mesh sizes refer to values measured on Tyler screens. All particle size of charge material refers to the size of the ultimate particle and is reported as microns (e.s.d.). Particle size in the micron-size range was determined by the sedimentation procedure described in TAPPI Standards, T649 sm-54; particle size data in ranges below 0.5 micron were determined by a simple modification of the TAPPI method which provided for the use of a long arm centrifuge, as described in a publication by F. H. Norton and S. Speil in J. Am. Ceramic Soc., 21, 89 (1938). Brightness values refer to values obtained with a General Electric Recording Spectrophotometer calibrated against a pure white standard having 100 percent reflectance at all wavelengths in the visible spectrum. The General Electric Recording Spectrophotometer color analyzer is described by Hardy, A. C., J. Optical Soc. A., 28, 10 (1938).

Example I

This example demonstrates the fact that clay picks up iron when a dispersed pulp of the clay is ground with steel shot and that the ground clay may not bleach to the ultimate brightness even when excessive bleach is used with the shot ground clay material.

A continuous plant-scale run of the steel shot grinding process was carried out in a 10′ x 20′ shell made of low carbon steel. The horizontal shell was charged with 25 tons of cast steel shot (10/35 mesh, Tyler). The mill was charged with a 35 percent solids slip of NoKarb clay containing approximately 6½ tons of the clay.

The mill was continuously rotated at 8½ r.p.m. (35 percent of critical speed) with the 35 percent solids pulp charged at a feed throughput rate of 2.26 tons clay solids per hour. Retention time of the clay in the mill was calculated to be about 3 hours. The shot was retained in the mill thoughout the process.

The ground clay was fractionated to remove 65 percent by weight of the plus 2 micron (e.s.d.) particles.

Following are particle size distributions of the ground clay and a typical NoKarb clay, illustrating the effectiveness of the process in reducing the size of the clay.

PARTICLE SIZE DISTRIBUTION OF CLAY PRODUCTS

| Wt. Percent Finer Than— | NoKarb Clay, Microns | Shot-Ground Fractionated NoKarb Clay, microns |
|---|---|---|
| 100 | 25 | 12 |
| 97 | 20 | 10 |
| 96 | 18 | 7 |
| 93 | 13 | 5 |
| 83 | 9 | 4 |
| 40 | 5 | 1.5 |
| 32 | 3.5 | 0.8 |
| 23 | 2.5 | 0.6 |

The slip of fractionated, shot-ground NoKarb clay was flocced with sulfuric acid to a pH of 2.5, and portions of the flocced clay were bleached with various quantities of zinc hydrosulfite. The brightness of the bleached clay products was measured.

It was found that maximum brightness (87.3 percent) was obtained using 2 lbs./ton zinc hydrosulfite.

In a control test, a slip of the NoKarb clay was ground in a horizontal mill with 10/35 mesh blast sand instead of the steel shot. The grinding conditions were similar to those employed with the steel shot. However, to account for the markedly greater efficiency of the shot as a grinding medium, the grinding time was increased when grinding with the sand. The sand ground product was fractionated to obtain a fine size fraction similar in size to the shot-ground product. The sand ground clay was bleached with various quantities of zinc hydrosulfite.

Using the sand as the grinding medium, maximum clay brightness of the fine size fraction was 88.0 percent. This brightness was obtained with 11 lbs./ton zinc hydrosulfite.

A comparison of the results of the shot and sand grinding shows that although half as much bleach was used when grinding with sand, the product was brighter than the clay ground with the shot.

Example II

This example demonstrates how iron pickup can be reduced and normal response to bleach reagent restored when clay is ground with steel shot at a high pH, in accordance with this invention.

(A) A batch of NoKarb kaolin was made into a 25 percent solids slip by agitating the clay in water containing tetrasodium pyrophosphate in amount of 1 lb./ton clay and soda ash in amount of 12 lbs./ton clay. The pH of the clay slip was 10.4. The sample of NoKarb analyzed 0.22 percent Fe (dry weight basis) before the grinding.

The one-gallon jar was charged with 6590 grams of the "as-cast" steel shot. A portion of the slip containing 12 lbs./ton soda ash was added to the jar in amount of 1000 grams (containing 250 grams clay). The jar was rotated at 100 r.p.m. for 30 minutes. The slip was then immediately decanted, removing as much slip as practical, in order to minimize exposure of the slip to the air. The grinding medium was retained in the jar. A second 1000 gram charge of the soda ash-treated slip was immediately added to the mill and the jar was again rotated for 30 minutes. The procedure was repeated for a total of eleven cycles.

The ground slip from each cycle was dried in a Pyrex dish and each dried product was analyzed for percent Fe (total—including Fe indigenous to the NoKarb clay). A composite of the ground slips from cycles 2 to 11 was prepared. The slip was flocced by adding sulfuric acid to a pH of 2.5, filtering and bleaching with zinc hydrosulfite. This was done in order to determine the bleachability of the ground clay.

Using 12 lbs./ton of soda ash in the grinding circuit, the Fe content of the ground products from each cycle was about 0.22 percent, indicating that substantially no iron pickup occurred during any of the cycles.

The bleached brightness of the unfractionated ground clay was 86.5 percent using 11 lbs./ton zinc hydrosulfite as the bleach reagent. This brightness was almost 1 percent higher than the bleached brightness of the NoKarb after being ground to a similar size in the same mill with clean sand and being bleached with a similar amount of bleach reagent.

(B) The steel shot grinding was repeated with the soda ash quantity reduced to 4 lbs./ton. The pH of the slip was 9.7. The ground products from each cycle analyzed between 0.30 percent and 0.38 percent Fe. Since the clay originally contained only 0.22 percent Fe, this indicates that in each cycle there was substantial iron pickup. It was also found that the composite ground material could not be bleached to a value comparable to that obtained with the sand. A comparison of the results of part B with part A of this example shows that sufficient caustic must be added to obtain the desired passivation of the grinding medium.

Example III (A) The procedure of Example II was repeated with a 250 gram charge of 25 percent solid NoKarb slip dispersed with 1 lb./ton tetrasodium pyrophosphate and 4 lbs./ton sodium hydroxide. The pH of the clay slip was 11.5. After eleven batch grinding cycles, each cycle of 30 minutes duration, the iron pickup by the clay was less than 0.01 percent, based on the clay weight. Unbleached brightness of the unfractionated composite was 80.7 percent. Bleached brightness was 85.2 percent at 4 lbs./ton zinc hydrosulfite and 85.7 at 8 lbs./ton of the bleach.

(B) In a modification of part A of this example, the NoKarb was dispersed in water at 50 percent solids with 1 lb./ton tetrasodium pyrophosphate and 2 lbs./ton sodium hydroxide. The pH of the clay slip was 11.5. Five hundred grams of the slip was ground with a 250 lb. charge of the steel shot in batch operations. A total of eleven batches were ground, each grind being of 30 minutes duration. The overall iron pickup was less than 0.01 percent, indicating that the iron remained substantially passivated throughout the cycles.

We claim:

1. A method for treating minus 325 mesh mineral pigment particles which comprises charging a cylindrical horizontal baffle-free, agitator-free drum with a fluid suspension comprising minus 325 mesh mineral particles, water, minus 4 plus 35 mesh rounded steel particles, at least one dispersant of the group selected from alkali metal silicate, alkali metal condensed phophate and alkali metal carbonate, and an alkali sufficient to form a dispersed pigment slip having a pH of at least 10, continuously rotating the drum with said suspension at a speed less than critical for a time sufficient to reduce the size of the pigment particles, separating the pigment particles from said steel particles, and bleaching the pigment particles.

2. The method of claim 1 wherein said pigment is uncalcined kaolin clay.

3. The method of claim 1 wherein said pigment is calcined kaolin clay.

4. The method of claim 1 wherein said steel particles comprise minus 10 plus 35 mesh shot.

5. The method of claim 2 wherein the suspension occupies about one-half the volume of the drum, and the steel shot occupies about two-thirds of the total volume of said suspension.

6. The method of claim 2 wherein said steel shot that is separated from said slip is reused in carrying out said method a plurality of times.

7. The method of claim 1 wherein said steel is untempered cast shot.

8. The method of claim 1 wherein said pH is within the range of 10 to 12.

9. The method of claim 8 wherein said pH is within the range of 10.3 to 11.5.

10. The method of claim 1 wherein sodium hydroxide is said alkali which is employed to form said slip having a pH of at least 10.

References Cited

UNITED STATES PATENTS

| | | | |
|---|---|---|---|
| 3,282,435 | 11/1966 | Goldberg et al. | 23—110.2 |
| 2,361,059 | 10/1944 | Robertson | 106—309 |
| 2,987,473 | 6/1961 | Millman et al. | 106—72 |
| 3,097,801 | 7/1963 | Duke | 106—288 |
| 3,313,492 | 4/1967 | Jacobs et al. | 106—72 |

JAMES E. POER, *Primary Examiner.*

UNITED STATES PATENT OFFICE
CERTIFICATE OF CORRECTION

Patent No. 3,398,008                            August 20, 1968

Daniel A. Jacobs et al.

It is certified that error appears in the above identified patent and that said Letters Patent are hereby corrected as shown below:

Column 4, in the table, first column, between lines 5 and 6 thereof, insert -- 50 --; same table, second column, between lines 6 and 7 thereof, insert -- 4 --; same table, third column, between lines 6 and 7 thereof, insert -- 1.1 --; line 75, "2 lbs." should read -- 22 lbs. --. Column 6, line 3, "solid" should read -- solids --.

Signed and sealed this 20th day of January 1970.

(SEAL)
Attest:

Edward M. Fletcher, Jr.                      WILLIAM E. SCHUYLER, JR.
Attesting Officer                               Commissioner of Patents